Patented Jan. 1, 1952

2,581,014

UNITED STATES PATENT OFFICE 2,581,014

PROCESS FOR METHYLATION OF AROMATICS

Manuel H. Gorin, San Francisco, Calif., and Everett Gorin, Mount Lebanon, Pa., assignors, by mesne assignments, to Socony-Vacuum Oil Company, Incorporated, New York, N. Y., a corporation of New York No Drawing. Application December 11, 1945, Serial No. 634,393

1 Claim. (Cl. 260—671)

This invention relates to the nuclear alkylation of aromatic compounds with alkyl halides to produce aromatic compounds having one or more aliphatic side chains. Such substituted aromatic compounds are of value in many fields involving the use of synthetic organic chemicals and some are particularly desirable as constituents of high octane aviation fuels and as intermediates suitable for use in the production of synthetic rubber. This application is a continuation-in-part of our co-pending applications, Serial No. 460,654, filed October 3, 1942, and Serial No. 420,493, filed November 26, 1941, both now abandoned.

More particularly this invention relates to an improved process for the catalytic alkylation of these aromatic compounds. Catalytic processes for the alkylation of aromatic compounds are well known. Generally, such catalyst processes make use of the Friedel-Crafts type catalyst, especially aluminum chloride or ferric chloride. Such catalysts are fairly satisfactory for small scale production, but are unsatisfactory for large scale production because of the great expense involved in the loss of large amounts of catalyst. The Friedel-Crafts type of catalysts form strong complexes with aromatic compounds so that separation of the products and recovery of the catalyst is difficult. Consequently even when these catalysts are promoted with halogen acids or in various other ways, they have definite drawbacks for large scale commercial use.

Various attempts have been made to use contact catalysts for the alkylation of aromatic compounds. Such processes have all suffered from the disadvantage of either requiring such long contact times and such large amounts of catalyst as to make continuous operation impossible or have required such high temperatures and pressures for the reaction as to be impractical from the standpoint of equipment design and operating costs.

It is an object of this invention to develop a type of catalyst which will have sufficient activity at slightly to moderately elevated temperatures to make the continuous alkylation of aromatic compounds feasible. It is a further object of the invention to develop such a continuous alkylation process which will not require the use of high pressures, although high pressures may be used in our process. Another object of our invention is to develop an improved catalyst for carrying out the alkylation reaction. Other objects of our invention will be apparent from the description thereof, in conjunction with the appended claims.

In general, our invention consists of passing a mixture of aromatic compound with an alkyl halide, such as an alkyl chloride or bromide, through an alkylation zone at a temperature within the range of from about 50° C. to 375° C. and at a pressure of from atmospheric to 2000 pounds per square inch or higher over a contact catalyst of the mixed oxide type. The contact catalysts which have proved to have sufficient activity for a continuous low temperature alkylation process are composed of a mixture of an amphoteric oxide, such as the oxides of the metals of group II and of group III of the periodic table, with a hydrated oxide of a weakly acidic nature, such as silica gel, hydrated boric oxide, thoria, zirconia, stannic acid, and the like. The amphoteric oxide used should not be the amphoteric oxide of a metal easily oxidized to a non-amphoteric oxide of higher valence. For example, such oxides as stannous oxide and antimony trioxide are amphoteric, but the higher valence oxides of these metals are acidic and the oxides of these metals are not suitable. The amphoteric oxide should not be reactive with the halogen acid liberated by the condensation of the alkyl halide with the aromatic compound since otherwise the oxide would be converted to the corresponding metallic chloride which would in turn react with the hydrocarbons to form the objectionable metallic chloride-hydrocarbon complexes. The amphoteric oxide selected for use should also not be one that would be reduced to the metallic state by the hydrocarbons at the alkylation temperatures employed. For example, lead oxide should not be used as the amphoteric oxide constituent of the catalyst where it is contemplated to utilize the catalyst in an alkylation process conducted at temperatures much above about 250° C. Typical suitable amphoteric oxides are alumina, beryllium oxide, chromium oxide, gallium oxide, and the like. The use of mixtures of two or more of the amphoteric oxides as the amphoteric constituent of our catalyst is also contemplated and is within the scope of our invention.

Our mixed oxide catalysts are characterized by being strongly acidic in character, and this strongly acidic character is the result of the special method used for the preparation of the catalysts. The amount of amphoteric oxide present in our mixed catalysts may vary from a few tenths of one percent up to about twenty percent. The amount of amphoteric oxide required to give the greatest activity varies to a certain extent depending upon the particular oxide mixture used, and varies widely with the particular method of preparation used.

This variation in the preferred amount of amphoteric oxide is due, we believe, to a variation in the concentration of amphoteric oxide present at the catalyst surface with the different methods of preparation. It is our belief, although our invention should not be limited to any particular theoretical considerations, that the amount of amphoteric oxide present in the immediate neighborhood of the contact surfaces should be small relative to the amount of acidic oxide present. In the case of a catalyst prepared by the precipitation of aluminum oxide on neutral silica gel, the catalyst has good activity even though only a few tenths percent of the total catalyst is composed of alumina, and the amount of alumina on the catalyst so prepared should not be above three or four percent. On the other hand, a catalyst prepared by the coprecipitation of the mixed oxides should contain at least several percent of the amphoteric oxide, and usually will contain as much as ten to twelve percent or even higher, in order to have the greatest activity. Some naturally occurring mixed oxides, such as the alumina-silica clay known as "Floridin" may be activated by suitable treatment. These naturally occurring mixed oxides should also contain at least several percent of the amphoteric oxide, and may contain as much as fifteen percent or even slightly higher. The amphoteric oxide content of the mixed oxide catalysts is probably not as accurate a way of describing the composition as the amphoteric oxide-acidic oxide ratio, because of the presence of varying amounts of inert material, principally water, in the catalysts, depending upon their origin and mode of treatment in the case of the activated natural catalysts, or their method of preparation in the case of the synthetics. The amount of water will vary from about four or five percent to about twenty-five percent, and several percent of other materials, principally iron oxide, may be present in the natural catalytic oxide mixtures. The ratio of amphoteric oxide to acidic oxide is thus a more definite value since the variation in amount of these extraneous materials is discounted in its determination. The ratio of amphoteric oxide to acidic oxide in our active catalyst will vary from a few thousands to about 0.05 to 1 in the case of the amphoteric oxide deposited on acidic oxide type of catalyst, and from about 0.02 to about 0.20 to 1 in the case of the coprecipitated catalyst and naturally occurring catalyst.

The coprecipitated oxides and the naturally occurring mixed oxides may be activated by washing with a solution of a strong acid for controlled periods of time. Particularly with the coprecipitated oxides, excessive washing even with a cold acid should be avoided, otherwise the amphoteric oxide will be removed to such an extent that the catalyst will be substantially inactive. The coprecipitated oxides may also be activated by treatment with a solution of a salt of a weak base and a strong acid, particularly a salt of the amphoteric oxide employed such as an aluminum sulphate solution. One advantageous way for preparing such a coprecipitated catalyst is to precipitate a sodium silicate solution with an excess of aluminum sulphate so that the resulting supernatant is acid.

The naturally occurring oxides should be treated with rather concentrated acid solutions. Several successive treatments should be used, and these should preferably be alternated with a washing with alkaline solutions although this is not essential. The final treatment should, of course, be an acid washing. A long digestion with hot, concentrated acid should be avoided, however, as this will substantially completely remove any amphoteric oxide from the catalyst surface and substantially inactivate the catalyst. In order that the contact surfaces of the catalyst will retain some amphoteric oxide, it would seem that the amount of amphoteric oxide present in the catalyst as a whole must be a fairly high value. The acid activation step removes most of the amphoteric oxide from the exposed surfaces of the catalyst and lowers the total amphoteric oxide content to a certain extent. In the case of a naturally occurring clay, or a synthetic catalyst of the coprecipitated, mixed oxide type, the acid treatment should not be carried out to such an extent that the acid disintegrates the structure of the catalyst, dissolving out all or nearly all of the amphoteric oxide because such treatment would substantially completely remove all amphoteric oxide from the actual contact surfaces. Such a catalyst would be relatively inactive.

In view of the great difficulty in determining the details of the actual molecular and crystalline structure of the contact surface of the catalyst, the theory advanced as to the extremely small amounts of amphoteric oxide required in the case of catalysts prepared by the precipitation of such oxide on a hydrated acidic oxide has not been proved. It does fit well, however, with the requirement of considerably larger amounts of amphoteric oxide in the case of catalysts prepared by coprecipitation of the mixed oxides or by acid treatment of naturally occurring oxide mixtures.

Our invention is applicable to the alkylation of aromatic hydrocarbons of the benzene and naphthalene series. These hydrocarbons may be substituted, or unsubstituted, with the limitation that they must be free from nitrogen-containing substituent groups. We have found nitrogen-containing substituents, particularly nitro compounds and amines, are apt to poison our catalysts.

Our invention may be carried out either in the liquid or in the vapor phase. Since the preferred operating temperatures lie within the range of from 200° C. to 350° C. vapor phase operation offers the advantage that high pressures are not necessary. For vapor phase operation the process is preferably carried out at pressures of between 6 to 20 atmospheres. For liquid phase operation, the pressure must necessarily be sufficiently high to keep the reactants liquids. With the reactants in the liquid phase, the transfer of heat from the reactants to the outer walls of the reaction vessel and to cooling coils is much simpler. Since the reaction is exothermic, it is desirable to be able to get rid of this heat of reaction so that the temperature and pressure of the reactants may be kept at the desired value. Another advantage for liquid phase operation is that the product contains a higher ratio of mono-alkylated product to poly-alkylated product. Where a mono-alkylated product is desired this is obviously an advantage. A further advantage obtained from liquid phase operation is longer catalyst life. One possible explanation for the longer catalyst life obtained by using liquid phase conditions is that the liquid hydrocarbons act as a solvent for much of the impurities and by-product material formed, which would normally tend to accumulate on the surface of the catalyst and inhibit its activity.

The alkylation agents used are the alkyl halides, such as the alkyl chlorides and bromides. Examples of suitable alkylating agents are methyl chloride, methyl bromide, ethyl chloride, ethyl bromide, isopropyl chloride, n-propyl chloride, isobutyl chloride, and isoamyl chloride. In general, alkyl chlorides and bromides containing no more than 12 carbon atoms may be used. We have found that methyl chloride and the secondary and tertiary chlorides such as isopropyl chloride, tertiary butyl chloride, and the like, are most reactive, and they represent the preferred alkyl halide alkylating agents.

We are especially interested in the alkylation of the simple aromatic compounds such as benzene, toluene, xylene, naphthalene, etc. In general, the substituted aromatic compounds may be used with the restriction that there must be at least one hydrogen attached to the aromatic nucleus, since the alkylation reaction involves the displacement of a nuclear hydrogen. The aromatic nucleus must, however, be free from nitro, amine, or other nitrogen containing substituent group because of the effect of nitrogen compounds in poisoning our contact catalyst. Preferably, not more than two of the nuclear hydrogen atoms are substituted.

The preparation of typical catalysts suitable for use in our process is illustrated by the following examples.

*Example 1*

A coprecipitated alumina-silica catalyst was prepared by the addition with constant stirring of a sufficient amount of dilute aluminum sulphate solution to dilute sodium silicate solution so that the final mixture was just acid to litmus. The alumina-silica mass was filtered and washed several times with distilled water. It was then washed once with 5N HCl, followed by successive washings with distilled water until the wash water was free of chloride ion. The catalyst was dried for 24 hours at 125° C. This catalyst gave the following analysis by weight:

| | Per cent |
|---|---|
| $Al_2O_3$ | 9.1 |
| $SiO_2$ | 66.5 |
| Water | 24.4 |

The alumina-silica ratio for this catalyst was 0.14 to 1.

*Example 2*

An alumina on silica catalyst was prepared by the hydrolytic precipitation of alumina on the surface of a precipitated hydrated silica gel. The silica gel was prepared from a dilute solution of sodium silicate by precipitation with a slight excess of hydrochloric acid. The precipitated silica gel was then washed free of chloride ion. Alumina was precipitated on the surface of the silica gel by contacting the gel with a 0.2N aluminum sulphate solution at 90° C. for two hours. The catalyst was then washed until sulphate ion could no longer be detected in the wash water, and then dried at 125° C. for 48 hours. This catalyst gave the following analysis by weight:

| | Per cent |
|---|---|
| $Al_2O_3$ | 2.1 |
| $SiO_2$ | 92.1 |
| Water | 5.5 |

The alumina-silica ratio for this catalyst was 0.023 to 1.

*Example 3*

A sample of a commercial fuller's earth mined in Florida, having the trade name of "Floridin" was dehydrated by heating for four hours at 500° to 550° C. The catalyst was then activated by successive treatments with 30% concentrated hydrochloric acid and sodium hydroxide solutions. After a final treatment with hydrochloric acid, the catalyst was washed with distilled water until the wash water was free of chloride ion and ferric ion. The catalyst was then dried at 125° C. for twenty-four hours. The catalyst gave the following analysis by weight:

| | Per cent |
|---|---|
| $Al_2O_3$ | 12.0 |
| $SiO_2$ | 66.7 |
| $Fe_2O_3$ | 2.3 |
| Water | 10.1 |

The alumina-silica ratio for this catalyst was 0.18 to 1.

*Example 4*

A solution of 60 grams of beryllium nitrate in 400 cc. of distilled water was added to 200 cc. of sodium silicate solution containing a total of 29 grams of dissolved silica. After thorough mixing of the two solutions sufficient 5N hydrochloric acid was added to make the mixture just acid to litmus. The resulting precipitate was filtered and washed until free from chloride ion. The precipitate was then again washed with 0.5N HCl and then with distilled water until free from chloride ion. The catalyst was dried at 125° C. for twenty-four hours. This catalyst showed the following analysis by weight:

| | Per cent |
|---|---|
| BeO | 0.50 |
| $SiO_2$ | 89.5 |
| Water | 10.0 |

The beryllia-silica ratio for this catalyst was 0.006 to 1.

*Example 5*

26 grams of precipitated silica gel prepared as set forth in Example 2 digested with 500 cc. of a 0.3N solution of chromic nitrate at 90° to 95° C. for two hours. The silica catalyst was filtered and washed four times with 300 cc. of distilled water each time. The catalyst was dried at 125° C. for 24 hours. This catalyst gave the following analysis by weight:

| | Per cent |
|---|---|
| $Cr_2O_3$ | 0.12 |
| $SiO_2$ | 94.1 |
| Water | 4.9 |

The cromium oxide-silica ratio for this catalyst was 0.0013 to 1.

Our catalysts gradually lose activity because of the deposition of coke or difficulty volatile carbonaceous material thereon, even when used in liquid phase operation, until the catalyst reaches a point where it must be either regenerated or discarded. The spent alumina-silica catalysts, for example, can be regenerated to a substantial portion of their original activity by the removal of the deposited carbonaceous material. This carbonaceous material may be most simply removed by an oxidation process. When the catalyst is heated above about 550° to 600° C. depending upon the individual catalyst, it loses its activity almost completely within a short time. A catalyst that has been heated to or above this deactivation temperature is no longer suitable for use in a continuous alkylation process. Because of the thermosensitivity of our catalysts, the oxidation should be carefully controlled to prevent the catalyst from heating above the deactivation temperature. The oxidation-regeneration step is generally satisfactory if carried out within a relatively short time period and within the temperature range of from about 450° to about 550° C.

The following examples show the mode of operation of our invention for the continuous alkylation of benzene with typical alkyl halides. The examples are given in the illustrative sense only, and our invention should not be construed as limited to the reactants and reaction conditions employed therein.

In the following examples and throughout the specification and the appended claims by the use of the term "space velocity" or "standard space velocity," we mean the volume of reactants as ideal gases entering the reaction chamber per minute on the basis of standard conditions of temperature and pressure per unit volume of catalyst employed, unless otherwise indicated. Inasmuch as the aromatic hydrocarbons and the higher reactive paraffinic hydrocarbon derivatives do not normally exist as gases, this calculation must be made considering these compounds as ideal gases, from the volumes measured at the reaction conditions. Where the reaction is carried out in the liquid phase, the gaseous space velocity is a calculated value from the liquid space velocity measured at the reaction conditions.

Example 6

A mixture of benzene and methyl chloride containing 79 mole percent benzene was passed over an activated "Floridin" catalyst, prepared as described in Example 3, at a space velocity of 7.1 minutes$^{-1}$, at a temperature of 345° C., and at a pressure of 130 pounds per square inch. 42 percent of the methyl chloride charged was converted to methyl benzenes of which toluene comprised 70% of the total. Substantially complete conversion of the methyl chloride to alkylate may be obtained by the use of either lower space velocities or higher temperatures, or by recycling the unchanged methyl chloride.

Example 7

A catalyst of the alumina-on-silica type, similar to that described in Example 2 except that the alumina was precipitated at 90° C. rather than 80° C., was employed for the alkylation of a mixture of benzene and methyl chloride of the same composition as used in Example 6. The mixture of benzene and methyl chloride was passed over the catalyst at a temperature of 385° C. and at a space velocity of 14.0 minutes$^{-1}$. 36.4 percent of the methyl chloride was converted to methyl benzene of which toluene comprised 80% of the total. The remainder of the methyl chloride was recovered unchanged and could be recycled for further reaction.

Example 8

A mixture of benzene and methyl chloride containing 20 mole percent of methyl chloride was passed over a coprecipitated alumina-silica catalyst of the type described in Example 1 at a space velocity of 20.0 minutes$^{-1}$ and at a temperature of 365° C., and a pressure of 130 pounds per square inch was employed. 21 percent of the methyl chloride was converted to methyl benzene. 80 mole percent of the alkylate consisted of toluene, while the remaining portion was largely xylene.

Example 9

A mixture of benzene and 4 chloro 2 methyl butane containing 85 mole percent of the former was passed over an alumina on silica catalyst similar to the type shown in Example 2 except that a silica hydrogel was used as the catalyst base instead of the precipitated gel used in Example 2. The gel was prepared by adding acetic acid to the sodium silicate solution in such proportions that the gel set at a pH of 4. The benzene-amyl chloride mixture was passed over this catalyst at a space velocity of 16.0 minutes$^{-1}$ and at a temperature and pressure of 255° C. and 150 pounds per square inch respectively. 53 percent of the amyl chloride was converted to amyl benzene.

Example 10

The experiment of Example 9 was repeated at a space velocity of 8.0 minutes$^{-1}$ and a temperature of 300° C. Under these conditions 63 percent of the amyl chloride charged was converted to amyl benzene.

Example 11

A mixture of benzene and ethyl chloride containing 80.5 mole percent of the former was passed over a coprecipitated alumina-silica catalyst of the type prepared in Example 1 at a temperature of 350° C., a pressure of 310 pounds per square inch and a space velocity of 3.25 minutes$^{-1}$. 19.5 percent of the ethyl chloride was converted to ethyl benzene.

Alumina-silica catalysts represent the preferred class of catalyst because of their low cost, regenerability, high rate of conversion obtained, their stability in the presence of the halogen acids, other than hydrofluoric acid, and alkyl halides at the operating conditions employed. The synthetic type of alumina-silica catalyst such as the coprecipitated alumina-silica and alumina precipitated on silica type whose preparation is illustrated by Examples 1 and 2 are particularly preferred.

Not all acid-treated alumina-silica clays are suitable for our process. Not only must the clay be acid treated to produce the necessary activation, but also the structure and composition of the original natural clay must be such that the acid treatment is capable of producing the necessary activation. The exact composition and structural requirements are difficult of definition since so many forms of alumina-silica clays are in existence. Apparently the mild acid treatment used must be capable of removing the major portion of the alumina from the catalytic surfaces, and this is evidenced best by the reduction of the average alumina content to less than one-fifth that of the silica.

The essential property of a contact catalyst of the mixed amphoteric acidic oxide type would seem to be that it possess rather strong acidic properties. The acid-treated mixed oxide catalysts possess this property, while both silica alone and alumina alone are weakly acidic. In general catalytic alkylation reactions involve acid catalysts of some sort. Although we do not wish to be bound to any particular theoretical considerations, we believe its catalytic activity may be attributed to its acidic nature.

The reason for the enhanced acidic properties of the alumina on silica catalyst may be found by a consideration of the structure of silica gel. It is believed that the gel is formed by the successive splitting out of water from silicic acid Si(OH)$_4$ to form a lattice structure, the basic unit of which consists of a tetrahedral disposition of 4 oxygen ions around a central Si$^{4+}$ ion. The surface is characterized by the presence of hydroxyl groups that have not been split out as water in the condensation process. All the water of hydration is present on the surface as weakly acidic hydroxyl groups and the amount of hydration is therefore dependent on the surface area or degree of subdivision of gel. When alumina is adsorbed on the gel it can therefore be assumed that a salt is formed between the weakly acidic silica hydroxyls and one of the amphoteric hydroxyls of the aluminum hydroxide. The result is the enhancement of the acidic properties of the two remaining free hydroxyl groups of the alumina. In other words, the absorption of the alumina results in the formation of the relatively strong surface aluminosilicic acid.

It is readily seen therefore, that for similar reasons the adsorption of any amphoteric hydroxide on silica gel will similarly result in the development of strongly acid properties by the surface with consequent catalytic activity for alkylation reactions.

Other hydrated oxides which possess weakly acidic properties and which may be prepared in a gel of very finely divided state may be used. Thus, hydrated boric oxide, thoria, zirconia, titania, stannic acid and the like may serve as a support for the amphoteric oxides. The above acidic oxides may also be used in admixture with silica.

The yield per unit weight of catalyst may be increased by increasing the pressure at which the reaction is carried out. This is particularly true when operating in the liquid phase. One reason for the increase in yield increase in pressure is the increase in throughput and standard space velocity that may be obtained even though the actual space velocity of the reaction mixture at the higher pressure may be the same as at the lower pressure. In general, the denser and more vitreous catalysts are more affected by changes in the pressure at which the alkylation reaction is conducted. For example, "Floridin" becomes relatively more effective, as compared with the alumina-silica catalyst, as the pressure at which the alkylation is carried out is raised, indicating that the former catalyst is more pressure sensitive.

Liquid phase operation favors the formation of higher ratios of mono-alkylate to poly-alkylate product. This is probably due to the tendency of the alkylate product in vapor phase operation to accumulate on the catalyst surface where it is more favorably situated to react with additional alkyl halide to form a poly-alkylate product. When the reaction is carried out under higher pressure so that the reactants are maintained in the liquid phase, the liquid hydrocarbons present tend to dissolve the mono-alkylate product from the catalyst. As a result of this solution effect, the concentration of the mono-alkylate and aromatic hydrocarbons at the catalyst surface is substantially the same as elsewhere throughout the reaction mixture. Since the reaction is preferably carried out using a considerable excess of aromatic hydrocarbons, the amount of mono-alkylate product even at the end of the reaction will be much less than the amount of aromatic hydrocarbon and hence the alkyl halide will react with the aromatic hydrocarbon rather than the mono-alkylate product as the predominant reaction.

The reaction between the aromatic compounds and the alkyl halides becomes appreciable at temperatures considerably below 100° C. particularly where the more active catalysts, such as the synthetic alumina-silica catalyst, are used. With the short chain alkyl halides temperatures up to about those employed for regeneration, i. e., up to about 425° C. or slightly higher may be employed. Temperatures below 400° C. are preferred since increasing the temperature above 400° C. does not appreciably improve the yield. With the longer chain alkyl halides, i. e., alkyl halides of four or more carbon atoms, temperatures below 400° C. and preferably below 375° C. should be used in order to avoid cracking of the alkyl halides. The preferred temperature range for carrying out our process is from 200° to 350° C. As mentioned previously it is frequently desirable to carry out the reaction in the liquid phase in order that a high ratio of mono-alkylate to poly-alkylate product will be obtained and for other reasons previously discussed. Where liquid phase operation is to be used the temperature is preferably maintained between 200° and 275° C. in reactions involving the short chain alkyl halides in order to avoid the necessity for the use of excessively high pressures to maintain the reactants in the liquid phase.

The ratio of the amount of aromatic hydrocarbon to alkyl halide which is fed into the reaction zone is not critical. So long as there are replaceable nuclear hydrogen atoms present we have not noted any tendency for the olefin to polymerize or for other side reactions to occur. This is surprising inasmuch as these catalysts are excellent polymerization catalysts. It is therefore evident that in order to avoid these undesirable side reactions it is advisable to maintain the ratio of aromatic compound to alkyl halide greater than 1 to 1. We generally prefer to operate with the ratio of aromatic compound to alkyl halide greater than 2 to 1. This higher ratio results in a more efficient use of the halide reactant. The percentage of halide converted will be increased to a certain extent by increasing this ratio, although this increase is accomplished at some sacrifice in the yield per unit weight of catalyst, assuming that the other factors remain constant. Increasing this ratio will also increase the percentage of mono-alkylate to poly-alkylate product through the effect of having a greater percentage of aromatic compounds present as unalkylated aromatic compounds. The halide will preferentially alkylate the original aromatic, rather than the mono-alkylate present in the reaction mixture.

In the foregoing description we have been particularly concerned with the alkylation reaction employing monochloro or monobromoalkanes. Our invention is also applicable to the use of halide alkylating agent wherein two or more of the hydrogen atoms of the alkane are replaced by a halogen substituent. In such cases two or more aromatic nuclei may be attached to a single alkyl group. For example, benzene and chloroform will react to give triphenyl methane. This is of particular interest for the preparation of polyarylmethanes but polyaromatic substituted alkanes in general may also be obtained by the alkylation of a molar excess of aromatic compounds with the corresponding polyhaloalkanes.

Having described our invention and the manner in which the same is to be carried out, many modifications thereof will be apparent to those skilled in the art. Our invention should not be limited except as indicated in the appended claim.

We claim:

A continuous process for the production of an alkyl benzene which comprises continuously passing a mixture of benzene and methyl chloride in which the mol ratio of benzene to methyl chloride is greater than 1 to 1 over a contact catalyst consisting essentially of an association of silica and alumina in which the weight ratio of silica to alumina is from 1 to 0.2 to 1 to 0.001, said alumina-silica catalyst having been subjected to an acid environment in the final stages of its preparation, at a temperature not greater than 400° C.

MANUEL H. GORIN.
EVERETT GORIN.

REFERENCES CITED

The following references are of record in the file of this patent:

UNITED STATES PATENTS

| Number | Name | Date |
|---|---|---|
| 2,164,334 | Marks | July 4, 1939 |
| 2,352,200 | Ipatieff et al. | June 27, 1944 |
| 2,364,762 | Schmerling et al. | Dec. 12, 1944 |
| 2,368,446 | Buc | Jan. 30, 1945 |
| 2,384,505 | Thomas et al. | Sept. 11, 1945 |
| 2,402,092 | Schmerling et al. | June 11, 1946 |
| 2,410,111 | Thomas et al. | Oct. 29, 1946 |

OTHER REFERENCES

Gayer Ind. Eng. Chem., Vol. 25, 1122-27 (1933).